(12) United States Patent
Decker et al.

(10) Patent No.: US 10,309,862 B2
(45) Date of Patent: Jun. 4, 2019

(54) FILM CHAMBER WITH MEASURING VOLUME FOR GROSS LEAK DETECTION

(71) Applicant: INFICON GmbH, Cologne (DE)

(72) Inventors: Silvio Decker, Cologne (DE); Norbert Rolff, Kerpen (DE)

(73) Assignee: INFICON GmbH, Cologne (DE)

( * ) Notice: Subject to any disclaimer, the term of this patent is extended or adjusted under 35 U.S.C. 154(b) by 107 days.

(21) Appl. No.: 15/511,050

(22) PCT Filed: Sep. 14, 2015

(86) PCT No.: PCT/EP2015/070936
§ 371 (c)(1),
(2) Date: Mar. 14, 2017

(87) PCT Pub. No.: WO2016/041893
PCT Pub. Date: Mar. 24, 2016

(65) Prior Publication Data
US 2017/0254720 A1   Sep. 7, 2017

(30) Foreign Application Priority Data

Sep. 15, 2014   (DE) .................. 10 2014 218 399

(51) Int. Cl.
*G01M 3/26*   (2006.01)
*G01M 3/32*   (2006.01)

(52) U.S. Cl.
CPC ............ *G01M 3/26* (2013.01); *G01M 3/3218* (2013.01); *G01M 3/3281* (2013.01)

(58) Field of Classification Search
CPC .... G01M 3/26; G01M 3/3218; G01M 3/3281; G01M 3/329; G01M 3/36; G01M 3/363; G01M 3/3245; G01M 3/3236; G01M 3/32; G01M 3/04; G01M 3/24; G01M 3/3272
USPC ..................... 73/49.2–49.3, 40, 52
See application file for complete search history.

(56) References Cited

U.S. PATENT DOCUMENTS

| 4,593,554 A | 6/1986 | Aarts |
| 5,625,141 A | 4/1997 | Mahoney et al. |
| 6,513,366 B1 | 2/2003 | Stauffer |
| 6,955,076 B1 | 10/2005 | Widt et al. |
| 2014/0311222 A1 | 10/2014 | Decker et al. |

(Continued)

FOREIGN PATENT DOCUMENTS

| CN | 1364232 A | 8/2002 |
| CN | 1975414 A | 6/2007 |
| DE | 2458137 A1 | 6/1976 |

(Continued)

OTHER PUBLICATIONS

English translation, John et al., Maturation apparatus and monitoring method, Sep. 2013.*

*Primary Examiner* — John Fitzgerald
*Assistant Examiner* — Truong D Phan
(74) *Attorney, Agent, or Firm* — The Webb Law Firm

(57) ABSTRACT

A film chamber for receiving a test object which is to be tested with respect to the presence of a leak, wherein the film chamber has walls enclosing a film chamber volume, said walls having at least one flexible wall region, wherein a measuring volume adjoining the flexible wall region is arranged on the side of the flexible wall region which is situated opposite the film chamber volume and is hermetically separated from the film chamber volume.

12 Claims, 2 Drawing Sheets

(56) References Cited

U.S. PATENT DOCUMENTS

2015/0241298 A1    8/2015  Decker
2016/0208206 A1*  7/2016  Nicholls ................. C12H 1/22

FOREIGN PATENT DOCUMENTS

| DE | 102012200063 A1 | 7/2013 | |
| DE | 102012217945 A1 | 4/2014 | |
| EP | 0741288 A1 | 11/1996 | |
| JP | 10185752 A | 7/1998 | |
| WO | 2013072173 A2 | 5/2013 | |
| WO | WO 2015140041 A1 * | 9/2015 | ......... G01M 3/3209 |
| WO | WO 2015140042 A1 * | 9/2015 | ......... G01M 3/3209 |

* cited by examiner

FILM CHAMBER WITH MEASURING VOLUME FOR GROSS LEAK DETECTION

CROSS-REFERENCE TO RELATED APPLICATIONS

This application is the United States national phase of International Application No. PCT/EP2015/070936 filed Sep. 14, 2015, and claims priority to German Patent Application No. 10 2014 218 399.5 filed Sep. 15, 2014, the disclosures of which are hereby incorporated in their entirety by reference.

Disclosed embodiments relate to a film chamber for receiving a test object to be tested for the presence of a leak.

BACKGROUND OF THE INVENTION

Field of the Invention

A film chamber is a test chamber with at least one flexible wall portion made e.g. of a film material. A typical film chamber comprises two film layers laid one against the other around the test object so as to entirely enclose the test object. After having received the test object, the film chamber is hermetically sealed and evacuated. Thereafter, the pressure change in the film chamber volume is monitored in the region outside the test object, where a pressure increase is considered an indication of a leak in the test object. As an alternative to monitoring the pressure in the film chamber volume, it is also possible to monitor the flexible wall portion, where a change in the flexible wall portion or the film, respectively, may indicate a leak. Such a method is known from DE 10 2012 200 063 A1.

With a test object having a gross leak it is a problem that upon evacuating the film chamber, the test object is simultaneously evacuated as well through the gross leak. Measuring the pressure increase for detecting a leak after the evacuation of the film chamber must fail in this case. A gross leak is considered to be a leak allowing a volume flow through the leak that draws a substantial portion of the free volume in the test object during the pump-down time.

SUMMARY OF THE INVENTION

It is an object of the present invention to provide a film chamber and a corresponding method to enable the detection of a gross leak in a test object.

A measuring chamber adjoins the flexible wall portion delimiting the film chamber volume, which chamber is hermetically separated from the film chamber volume. When a test object having a gross leak is tested, the test object is also evacuated at least to a certain degree as the film chamber is evacuated. Due to the flexible wall portion between the film chamber volume and the measuring volume, the measuring volume then becomes larger. The increase in measuring volume is greater than in the case of a tight test object or in the case of a test object having a smaller hole. In the case of a tight test object only the film chamber volume in the region outside the test object is evacuated. In the case of a test object having a gross leak also the test object or at least a part of the test object volume is evacuated. Thus, in the case of a gross leak a larger volume is evacuated than in the case of a tight test object. Accordingly, the expansion of the volume is the larger, the larger the leak in a test object is. Based on the expansion of the measuring volume and/or the flexible wall portion it is then possible to make a statement on the size of a possible leak in the test object.

The film chamber preferably has two film layers, each forming the flexible wall portion. The two film layers enclose the film chamber volume in the closed state of the film chamber. Each film layer is supported and spanned by a frame element. Both frames may e.g. be hingedly connected with each other so that the film chamber can be folded to be opened or closed. In the open state of the film chamber it is possible to access the film chamber volume in order to place the test object in the film chamber. In the closed state of the film chamber the film chamber volume is hermetically separated from the atmosphere surrounding the film chamber on the outside.

The measuring volume may be formed by a measuring chamber having a measuring chamber ring and a measuring chamber cover. The measuring chamber ring has two opposing open ends. One of the open ends is closed by the film layer or the flexible wall portion, respectively. The opposite end of the measuring chamber ring is closed by the measuring chamber cover.

Preferably each of the two film layers is provided with a separate measuring chamber. The two measuring cambers may be connected in a gas-tight manner e.g. by a gas-carrying conduit and are hermetically closed against the atmosphere surrounding the film chamber and the measuring chambers on the outside.

A ventilation valve may be formed in at least one of the two measuring chambers. The ventilation valve may serve to adjust the pressure in the measuring chamber(s) in an appropriate manner. It is particularly advantageous if the pressure in the measuring chamber(s) corresponds to atmospheric pressure of approximately 1 bar when the film chamber contains a tight test object in the closed and evacuated state of the film chamber. Advantageously, the measuring chamber is vented when a tight test object or a test object with a particularly small leak is present in the film chamber and the film chamber has been evacuated.

The measuring volume of at least one measuring chamber should be connected with a sensor for monitoring the measuring volume. The sensor may be a pressure sensor or a flow sensor. As a pressure sensor a differential pressure sensor and a total pressure sensor may be used.

BRIEF DESCRIPTION OF THE DRAWINGS

The following is a detailed explanation of embodiments of the invention with reference to the Figures. In the Figures.

DETAILED DESCRIPTION OF THE INVENTION

Figure 1:
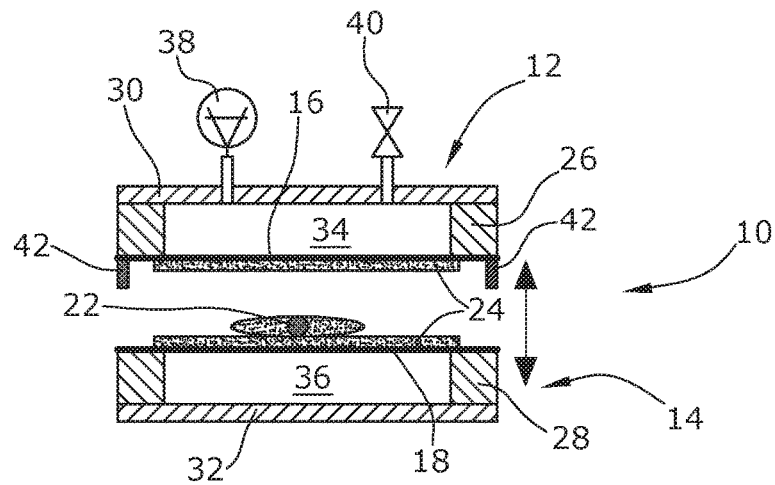
FIG. 1 shows the film chamber in the open state.
Figure 2:
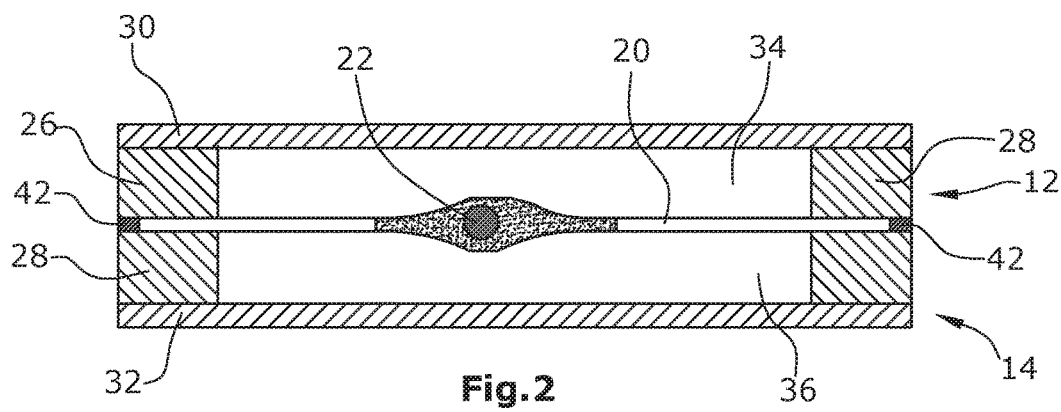
FIG. 2 shows a closed film chamber with a tight test object.

The film chamber 10 illustrated in FIG. 1 is formed by an upper cover 12 and a lower cover 14. The upper film layer 16 is an essential element of the upper cover and the lower film layer 18 is an essential element of the lower cover. In the closed state of the film chamber (see FIGS. 2 and 3) both film layers 16, 18 enclose the test object 22 contained in the film chamber volume 20. Each of the two film layers 16, 18 has a nonwoven 24 on its side facing the film chamber volume 20. Together with the nonwoven 24, each film layer 16, 18 forms the respective flexible wall portion of the film chamber 10. In the region of their outer edge the films 16, 18 are each connected with a measuring chamber ring in a gas-tight manner. The film layer 16 thus hermetically closes the lower end of the upper measuring chamber ring 26 facing the film chamber 10. The lower film layer 18 analogously closes the upper end of the lower measuring chamber ring 28 facing the film chamber volume 20. The end of each measuring chamber ring 26, 28, respectively opposite the corresponding film layer 16, 18, is hermetically closed with a measuring chamber cover 30, 32.

The measuring chamber cover 30, the measuring chamber ring 26 and the film layer 16 thus enclose an upper measuring volume 34, and the film layer 18, the measuring chamber ring 28 and the measuring chamber cover 32 enclose a lower measuring volume 36. The measuring volumes 34, 36 are hermetically separated from the film chamber volume 20 and the outer atmosphere surrounding the film chamber 10. The measuring volumes 34, 36 are connected with each other in a gas-conveying manner by means of a gas-conveying connection not illustrated in the Figures, e.g. a tube.

The upper measuring volume 34 is connected in a gas-conveying manner with a pressure sensor 38. A ventilation valve 40 formed in the upper measuring chamber cover 30 connects the upper measuring volume 34 with the atmosphere surrounding the film chamber 10 on the outside. In the closed state of the ventilation valve 40 the measuring volume 34 is hermetically separated from atmosphere and, in the open state of the valve, it is connected with atmosphere in a gas-conveying manner.

In the region of the outer edge a sealing ring 42 is provided between the two film layers 16, 18, which sealing ring provides a gas-tight connection between the film layers 16, 18 in the closed state of the film chamber 10.

FIG. 1 shows the film chamber 10 in the open state. The film chamber volume 20 is freely accessible so that the test object 22 can be placed in the film chamber volume 20. Thereafter, the film chamber 10 is closed and the film chamber volume 20 is evacuated. In the case of a tight test object, the state illustrated in FIG. 2 will occur. In this state both measuring volumes 34, 36 are ventilated via the ventilation valve 40 so that atmospheric pressure of about 1 bar prevails.

Figure 3:
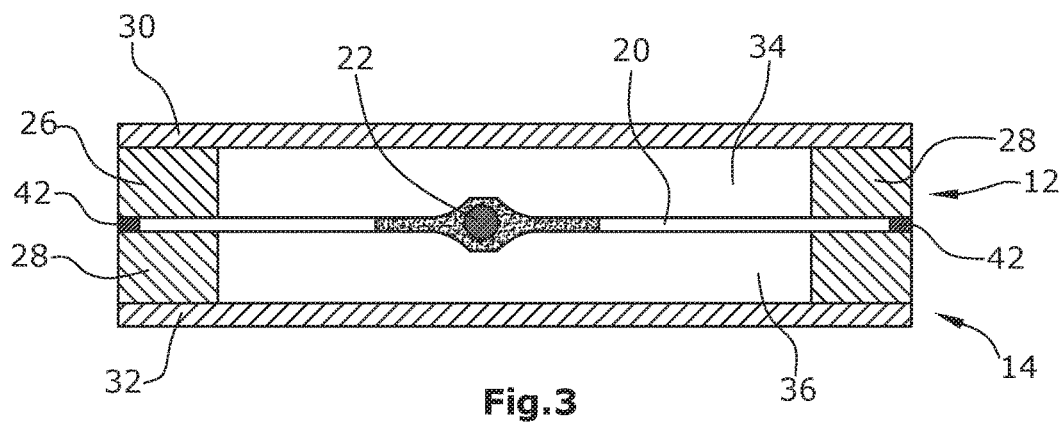
FIG. 3 shows a closed film chamber with a test object having a gross leak.

In the case of a leaky test object having a gross leak with a diameter of about 1 cm, the state illustrated in FIG. 3 occurs. Here, the test object 22 is co-evacuated to a large extent via gross leak when the film chamber volume 20 is evacuated. The inner pressure in the test object 22 then is lower than the pressure in the measuring volumes 34, 36. Via the film layers 16, 18 the pressure in the measuring volumes 34, 36 acts on the test object 22 so that, as illustrated in FIG. 3, the same is compressed and is evacuated as well. The resulting end pressure in the measuring volumes 34, 36 then is lower than in the state illustrated in FIG. 2 for a tight test object.

Figure 4:
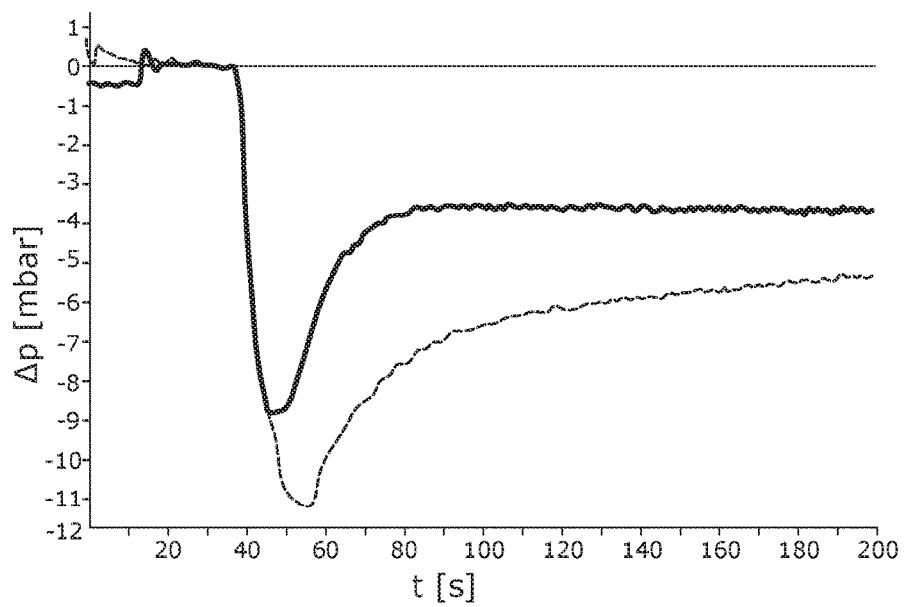
FIG. 4 shows the differential pressure characteristic in the measuring volume and FIG. 5 shows the total pressure characteristic in the measuring volume.

Using the pressure sensor 38 the pressure in the measuring volumes 34, 36 can be monitored during evacuation of the film chamber 10, so as to determine from the pressure characteristic whether the test object has a gross leak. FIG. 4 illustrates the measured differential pressure characteristics in the measuring volumes 34, 36. The continuous solid line represents the pressure characteristic of a tight test object as in FIG. 2. The broken line represents the pressure characteristic in the measuring volumes 34, 36 for a test object 22 with a gross leak as in FIG. 3. In the case of the tight test object the pressure drops to −9 mbar after about 45 seconds, and in the case of a test object with a gross leak the pressure drops to −11.5 mbar after about 55 seconds. Of course, other numeric values are conceivable in other cases or embodiments.

Figure 5:
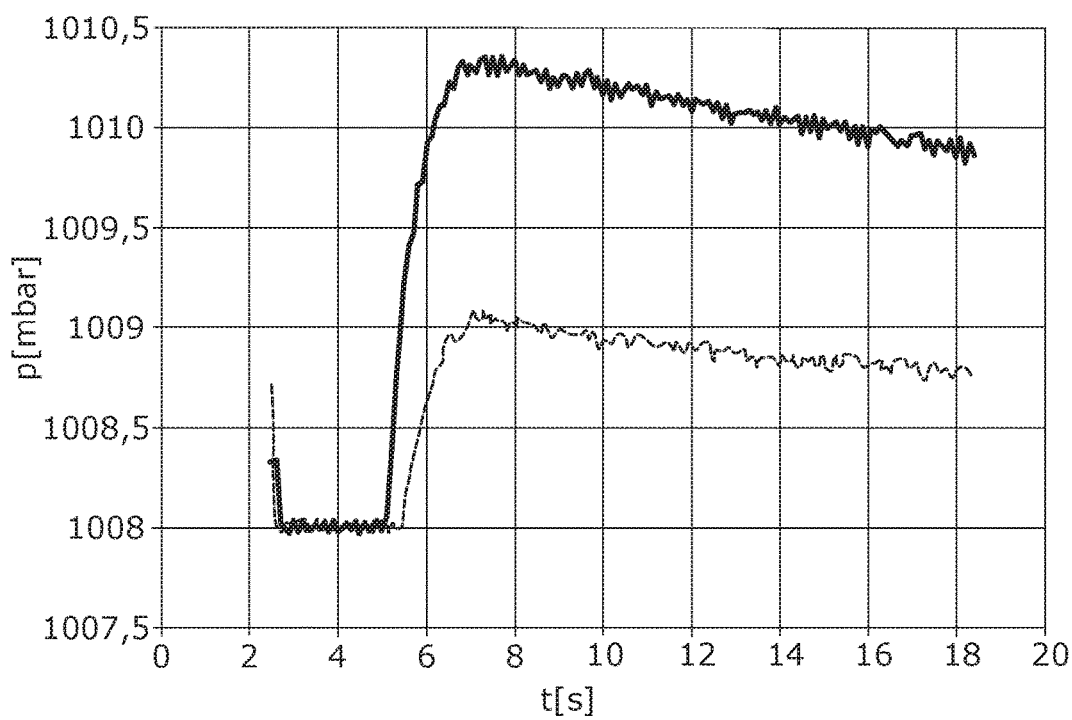

FIG. 5 shows the total pressure characteristic in the measuring volumes 34, 36. The pressure characteristic for a tight test object is illustrated as a continuous line and the pressure characteristic for a test object with a gross leak is illustrated as a broken line. The tight test object is not evacuated and displaces more volume in the film chamber that the test object with a gross leak which is partly co-evacuated during the measuring and therefore shrinks. The larger the volume of the test object, the greater the displacement of volume. Therefore, the pressure in the measuring volume increases to a greater extent for a tight test object than for a test object with a gross leak. In the example illustrated in FIG. 5, for a tight test object, the pressure increases by 2.5 mbar after a measuring time of about 7 seconds, while the total pressure increases by only 1 mbar for a test object with a gross leak.

The invention claimed is:

1. A film chamber for receiving a test object which is to be tested for a presence of a leak, wherein the film chamber has walls enclosing a film chamber volume, said walls having at least one flexible wall portion,
   wherein a measuring volume adjoining the flexible wall portion is arranged on a side of the flexible wall portion which is situated opposite the film chamber volume and is hermetically separated from the film chamber volume, wherein the measuring volume is connected in a gas-conveying manner with a sensor adapted to monitor parameters of the measuring volume comprising pressure change within, gas flow out of, or a size of the measuring volume during evacuation of the film chamber, in order to assess a size of a possible leak in the test object based on a monitoring result.

2. The film chamber of claim 1, wherein the sensor is a pressure sensor or a flow sensor.

3. The film chamber of claim 1, wherein the measuring volume is connected with an atmosphere surrounding the measuring volume via a ventilation valve.

4. The film chamber of claim 1, wherein the measuring volume is formed by a measuring chamber ring supporting the flexible wall portion at a lower side thereof and a measuring chamber cover closing the measuring chamber ring on a side opposite the flexible wall portion.

5. The film chamber of claim 1, wherein the film chamber has an open state for placing a test object in the film chamber volume and a closed state in which the film chamber volume is hermetically closed, wherein the measuring volume is hermetically closed independent of the state of closure of the film chamber.

6. The film chamber of claim 1, wherein the film chamber has a first and a second film layer which, in a closed state of the film chamber, enclose the film chamber volume, wherein a first measuring volume adjoins the first film layer and a second measuring volume adjoins the second film layer.

7. The film chamber of claim 6, wherein the first and second measuring volumes are connected in a gas-conveying manner.

8. A method for testing a test object for the presence of a leak, comprising:
   placing the test object in a film chamber,
   closing the film chamber,
   evacuating the film chamber, monitoring parameters of a measuring volume comprising pressure change within, gas flow out of, or a size of the measuring volume during evacuation of the film chamber, and assessing a size of a possible leak in the test object based on the monitoring result.

9. The method of claim 8, further comprising detecting a gross leak in response to the measuring volume increasing as the film chamber is evacuated.

10. The method of claim 8, wherein after the closing and evacuation of the film chamber, the measuring volume is ventilated if no gross leak is detected in the test object.

11. The method of claim 8, wherein a change in the measuring volume influenced by the test object placed therein is determined by measuring a pressure within the film chamber or by measuring a gas flow in the film chamber or from the film chamber.

12. The method of claim 8, wherein an absolute volume of the test object is determined by measuring a change in pressure in the film chamber or by measuring a gas flow in the film chamber or from the film chamber.

\* \* \* \* \*